J. A. TILLINGHAST.
APPARATUS FOR ELECTRICAL TRANSMISSION OF INTELLIGENCE BY WIRE.
APPLICATION FILED SEPT. 19, 1918.

1,353,000.

Patented Sept. 14, 1920.
5 SHEETS—SHEET 1.

Inventor:
James A. Tillinghast
by Wm. R. Tillinghast
Attorney.

J. A. TILLINGHAST.
APPARATUS FOR ELECTRICAL TRANSMISSION OF INTELLIGENCE BY WIRE.
APPLICATION FILED SEPT. 19, 1919.

1,353,000.

Patented Sept. 14, 1920.
5 SHEETS—SHEET 2.

Inventor:
James A. Tillinghast
by W. P. Tillinghast
Attorney

UNITED STATES PATENT OFFICE.

JAMES A. TILLINGHAST, OF PROVIDENCE, RHODE ISLAND.

APPARATUS FOR ELECTRICAL TRANSMISSION OF INTELLIGENCE BY WIRE.

1,353,000.  Specification of Letters Patent.   Patented Sept. 14, 1920.

Application filed September 19, 1918. Serial No. 254,812.

*To all whom it may concern:*

Be it known that I, JAMES A. TILLINGHAST, a citizen of the United States, formerly residing at Providence, in the county of Providence and State of Rhode Island, and now serving as an ensign in the United States Naval Reserve Force, have invented a new and useful Apparatus for Electrical Transmission of Intelligence by Wire.

My invention is intended primarily as a means for multiple electrical telegraphing, and I will describe it as applied to that purpose, although it may be useful for other purposes, such, for example, as photo-telegraphy.

It is advisable for an adequate understanding of my device to describe it in three successive steps, each one preliminary to the next. As is customary in a telegraph system, so in my invention, any station may be both a receiving and sending station. But with my invention there is one station with which all others are brought into unison of action or synchronized, and I have called this station the regulating station. For the sake of simplifying the description I shall assume that this is also the sending station, and that the synchronized station is the receiving station. But it must be understood that in practice both stations may be both sending and receiving stations as in any other telegraph system. I shall, therefore, assume in the following description that the station represented in Figs. 1, 2, 3 and 4, which is the regulating station, is also the sending station, and that represented in Figs. 5, 6, 7 and 8, which is a regulated or synchronized station, (there may be more than one of these), is also the receiving station. The three steps above referred to will then be, first, a description of the regulating or sending station; second, a description of the regulated or synchronized station, omitting therefrom any description of the switches and their operation; and third, a description of one form of switch. I will then further describe an additional feature which may prove in practice to be necessary, or at least advantageous, in some installations.

At the regulating station shown in Figs. 1, 2, 3 and 4 there is a stationary disk or commutator, 1 constructed with a metal segment 2 which extends for one-eighth, more or less, of its circumference, and which is insulated not only from the remainder of the disk but from all other parts excepting only the wire attached thereto and hereinafter described. There is also a shaft 3 mounted to rotate in proper supports 4—4 and driven by an electric motor or other source of power, (not shown), by means of a band and the grooved pulley 5. Upon the shaft 3 are mounted so as to rotate with it a number of metal disks, or ring commutators, eight of which are marked 6 on Fig. 1. Each of these ring commutators is insulated from every other and from the shaft. I have shown eight of these for the reason that I have chosen to describe my apparatus as arranged for eight transmitting and receiving instruments. A ninth disk 33 of exactly the same construction is part of the regulating or synchronizing device as hereinafter described. Also mounted on the shaft 3 to rotate with it is a further disk 7, which carries eight metal arms 8, (Fig. 1), equally spaced from one another, and each of which arms must be insulated from disk 7 unless disk 7 is itself constructed of insulating material. Each arm 8 supports a metal brush 9, each of which is, as here shown, attached to its arm 8 so as to be in electrical connection with it, and each of which bears upon the circumference of disk 1. (See more especially Fig. 2.) Bearing upon the circumference of each of the metal disks or ring commutators 6 is a brush 10, the other end of each of which is conveniently mounted upon a wooden or other non-conducting support 11, (Figs. 1 and 4), and each of which is furnished with a binding post 12 or other means for attaching wires. Each of the ring commutators, 6, is electrically connected with its arm 8 by one of the wires 16.

Figure 1:
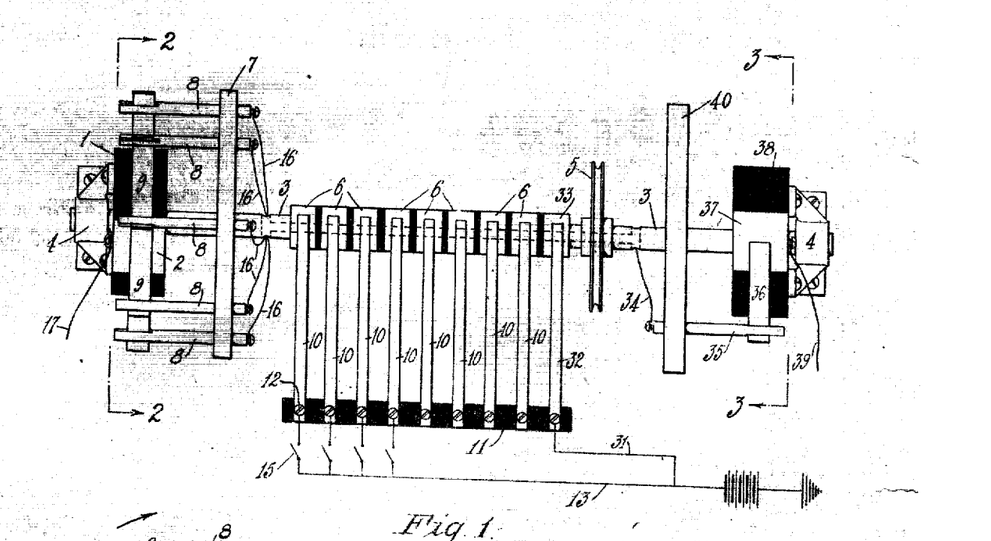
Figure 1 serves to illustrate a plan view of a regulating station of my invention.

The wiring of the apparatus thus far described is indicated in Fig. 1. A wire 13 furnishes power from the battery or other source of electrical energy, the other pole being grounded as indicated at 14. A transmitting, (or receiving), instrument, here indicated at 15—15, is interposed between the wire 13 and each of the brushes 10. The main service wire to the next station is indicated by 17 and is attached to segment 2 of disk or commutator 1. If we assume that the other end of the main service wire 17 is arranged to complete the electric circuit, and if the shaft 3 rotates at a considerable speed, for example several hundred rotations a minute, as the circuit is closed at any one of the make and break devices 15, a succession of electrical impulses will be transmitted to the main service wire 17 as that brush 9 which is electrically connected, (in the manner already stated), with the particular device which is closed passes over segment 2 of disk 1. Owing to the speed of the rotation these impulses are shorter than the dot of the Morse code.

I have thus far indicated the make and break device at 15 as a simple open switch, because in the operation of my device as a whole either a transmitting device or receiving device or both may be used at this point. But in the further description of the operation of my device it will be more convenient to refer to 15 as a key, or transmitting device.

Each one of the eight brushes 9 will transmit to segment 2 and through it to the main service wire 17 impulses received by the manipulation of its own key 15, and if all eight of these keys, for example, are in use, an electrical impulse from each key in succession will reach and be transmitted by the main service wire 17 as its particular brush 9 passes over segment 2. If now we were to assume a similar device at the next station with its shaft and its attachments rotating at exactly the same speed as shaft 3, and that the impulses were received through the main service wire, conducting segment, revolving brushes and arms, &c., to the ground, but that proper receiving instruments were inserted in the circuits at 15—15, it is evident that the series of electric impulses given by closing any given key 15 would always be transmitted to the same receiving instrument at the receiving station, and the inertia of the receiving instruments will prevent them from responding to each impulse and cause them to act in unison with the manipulations of the sending keys.

But while it is possible by means of properly wound motors or other means to cause two sets of brushes, such as 9—9 and 25—25, (see Figs. 5 and 6), at widely separated stations to rotate at nearly the same speed, it may not be practicable to make them rotate so absolutely in unison as is necessary for the purpose, and the second and third steps of my invention consist of means for accomplishing the same result although as a matter of fact the two sets of brushes are not rotating at the same speed. I accomplish this by apparatus periodically selecting one of more or less numerous conducting segments of a commutator of quite similar construction, (except the number and widths of the segments), as commutator 1, and placing that segment or segments in electrical connection with the main service wire for a certain short interval of time, after which the same or some other segment or set of segments is placed in such electrical connection during the next time interval.

Figs. 5, 6, 7 and 8 illustrate one of the regulated or synchronized stations. Much of the apparatus shown in these figures is a duplication of that of the regulating station shown in the first four figures of the drawings, but the commutator 18, (Figs. 5 and 6), is made up of quite numerous metal segments 19 each insulated from all others and from everything else except the wires connected with them and hereinafter described. The shaft 20 is driven through a grooved pulley 21, carries the eight metal ring commutators 22, (each insulated from every other and from the shaft 20), and the larger disk 23, to rotate with it. The larger disk 23 carries eight arms 24, each insulated from the disk 23, (unless that disk is itself made of insulating material), and attached to the arms 24 are eight brushes 25 each bearing on the circumference of the commutator 18. There are also eight metal stationary brushes 26 each bearing upon one of the ring commutators and mounted at its lower end on a support or table 27, of wood or other insulating material, (see especially Fig. 8), and each having its binding post 28 or other attachment for electric wires. 17 indicates the main service wire from the regulating station and interposed between it and the brushes 26 are electrical instruments, either keys or receiving instruments, or both, as the case may be, indicated by the open make and breaks at 29, and which for the sake of simplifying the description I will hereinafter consider as receiving instruments.

Each of the disks 22 is electrically connected with its own brush 25 by means of a wire 30.

Figure 2:
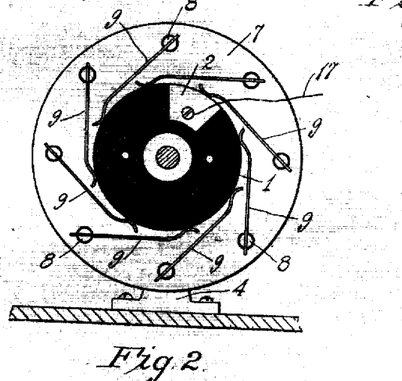
Fig. 2 is an end view on line 2—2.
Figure 3:
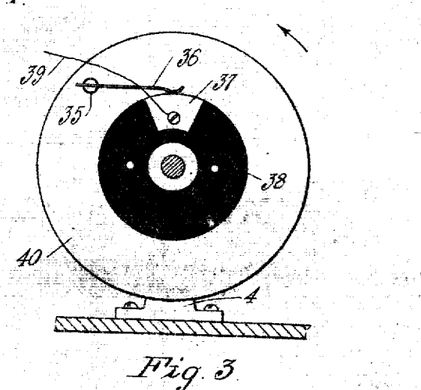
Fig. 3 is an end view on line 3—3, of Fig. 1.
Figure 4:
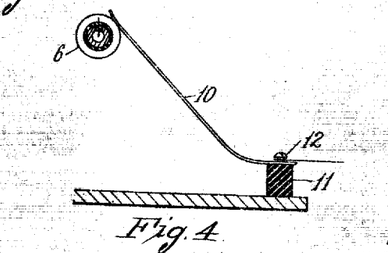
Fig. 4 shows one of the stationary brushes, its metal disk, the shaft upon which it is mounted, and its insulation from the shaft.

It will be perceived that thus far the apparatus shown in Figs. 5, 6, 7 and 8 is similar to that shown in Figs. 1, 2, 3 and 4, except that the commutator 18 as here shown consists of twenty-four insulated segments instead of having a single one inserted in its structure as in Figs. 1 and 2. If the shaft 20 could be made to rotate at exactly the same speed as shaft 3 of Figs. 1, 2, 3 and 4, it would only be necessary to place some one of the segments 19 of Figs. 5 and 6 in the main service circuit in order that the brushes 25 as they successively passed over it should complete a circuit for its particular receiving instrument. As it is not practicable to make the two shafts at widely separated stations rotate in exact unison, the same result may be attained by periodically and automatically selecting some one or more of the segments 19 to be so placed in the service circuit and keeping it in that circuit during short intervals of time. The means for accomplishing this consists of two devices,— first, disks or commutators and brushes very similar in construction to those already described, and second, certain switches. The disks or commutators and brushes of the first device are illustrated in Figs. 1 and 3 for the regulating station, and in Figs. 5 and 7 for a regulated or synchronized station. The elements making up the electrical regulating circuit at the regulating station and shown in Figs. 1 and 3 may be followed as follows: wire 31, brush 32, ring commutator 33, wire 34, arm 35, brush 36, segment 37 inserted in and insulated from the remainder of the disk or commutator 38, and wire 39,—the latter extending to the other stations and hereinafter referred to as the controller line wire. It will be understood that the arm 35 is connected to the shaft 3 to revolve with it, as for example, by the large disk 40 here shown, and that the insulations are the same as already described for the previously described commutators and brushes.

Figure 5:
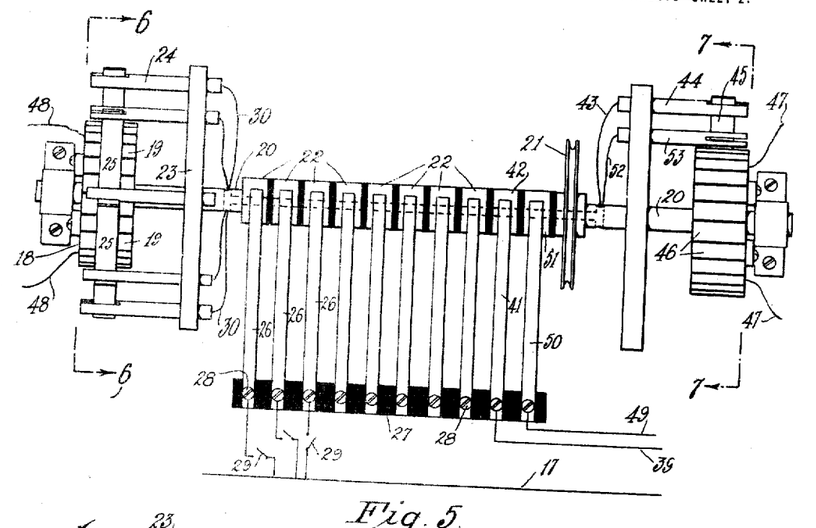
Fig. 5 serves to illustrate a plan view of a regulated or synchronized station.
Figure 6:
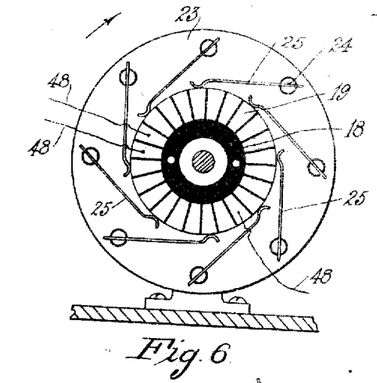
Fig. 6 is an end view of this station on line 6—6 of Fig. 5.
Figure 7:
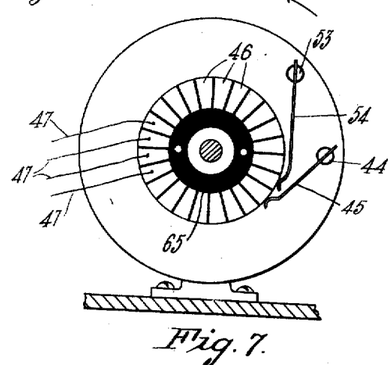
Fig. 7 is an end view on line 7—7 of Fig. 5.
Figure 8:
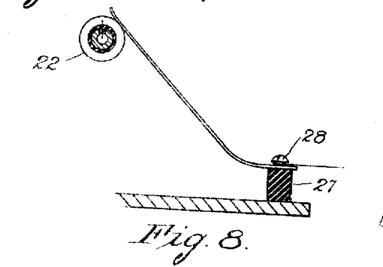
Fig. 8 shows the same elements at this station as Fig. 4 shows at the regulating station.

The disk and brush device at the regulated station illustrated in Figs. 5 and 7 is of similar construction except that the disk is composed of numerous, (twenty-four as shown), segments each insulated from everything else except the wire attached to it. The portion of the electrical circuit shown in Figs. 5 and 7 may be followed as follows:—through the controller line wire 39 which is to be understood as coming from the regulating station, brush 41, ring commutator 42, wire 43, arm 44, brush 45, and whichever of the segments 46 and its attached wire 47 may be selected as hereinafter described. Assuming some source of electrical energy and proper ground for wire 31, or that it is otherwise arranged to complete an electrical circuit, each time brush 36 passes over segment 37, as it will at each rotation of the shaft 3, an electrical impulse will pass over the controller line wire 39 and be transmitted to so many of segments 46 as brush 45 passes over during the interval of time that brush 36 is passing over segment 37, so that, as here shown, at each rotation of shaft 3 we have an electrical impulse transmitted to the regulated or synchronized stations. Wires 48, (some only of which are shown on Figs. 5 and 6), are attached to segments 19, each to its own segment. Each of the wires 47 from segments 46, (some only of which are shown on Figs. 5 and 7), and each of the wires 48 from segments 19, are brought to different elements of a switch, there being a switch for each set of wires as illustrated in diagram Fig. 9 in which AA indicates the switches. (For clearness only two switches are so marked). The segments of the commutators are shown in this figure separated one from another, but as all parts so far described, bear their correct numbers, the scheme can be readily seen. Referring primarily to the right hand portion of Fig. 9, and assuming that all of the switches are open, the electrical impulse received over the controller line wire 39, (see right hand top corner of drawing), when brush 36 of Fig. 1 passes over segment 37 will close those of the switches AA which are electrically connected by wires 47 with those segments 46 of Figs. 5 and 7 over which brush 45 passes during the continuance of the impulse, and the closing of the switches will complete circuits for those segments 19, (see Figs. 5 and 6), with which they are electrically connected by wires 48, as more fully described later.

Figure 9:
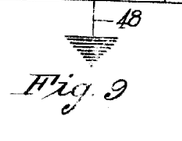
Fig. 9 is a diagrammatic drawing indicating the mechanical and electrical relations of the brushes, commutator segments, and the switches of both the regulating system and the operating system at a regulated or synchronized station.

At the regulated or synchronized station illustrated in Figs. 5, 6 and 7 there is also a local governing circuit arranged to open any of the switches AA which happen to be closed just before the controlling impulse arrives from the regulating station. This circuit consists of brush 50, ring commutator 51, insulated wire 52, arm 53, brush 54, (see Fig. 7), and the successive segments 46, as shown in Figs. 5 and 7, the wires 47 attached to the segments 46, and wire 49 with its battery or other source of electrical energy as illustrated in Fig. 9, the circuits being completed by attaching wire 49 to wire 39, as indicated. It is believed that a reference to Fig. 9 will make both the controlling circuit and the local governing circuit clear, it being assumed that brushes 54 and 45, as shown at the right of that drawing are moving to the left over segments 46. It will be observed that brush 54 is arranged to bear upon that segment 46 of Fig. 7 which immediately precedes that upon which brush 45 bears. As illustrated in Fig. 9, wires 47 are attached to the windings of the electric magnets constituting portions of the switches AA, and not only form a part of the governing circuits by which the switches are closed but also a part of each local governing circuit by which the switches are opened, it being understood that the mechanism is such that the currents in the two circuits may be caused to flow in opposite directions through the switches. Two separate windings upon the spools of the magnets might, however, of course, be used if desired. The effect of the local governing circuit is to open whichever of the switches that has been left closed by the previous governing impulse, thus opening each of the switches, at least momentarily, until the controlling impulse is received by brush 45, which immediately follows brush 54 of this local governing circuit. As will be presently explained the switches are constructed to remain either open or closed until they are positively acted upon by one or the other of the two circuits.

Figure 10:
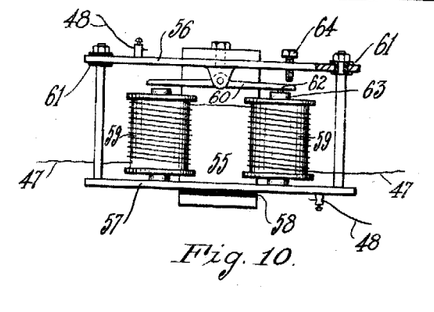
Figs. 10 and 11 are enlarged drawings of one form of switch.
Figure 11:
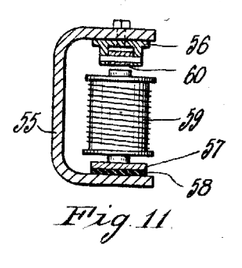

The form of switch to be selected will depend upon several factors, as for example the number and the inertia of the receiving instruments used and the speed of the rotating shafts 3 and 20. I have heretofore used the form of switch I am about to describe, but it may well be that some other form of switch, as for example, a spark switch, will prove more advantageous. The switch here illustrated in Figs. 10 and 11 consists of a permanent horseshoe magnet 55, extending above and below the upper and lower bars, 56 and 57 of a frame work, the magnet being insulated from the lower bar as indicated at 58. Two spools 59 of an electromagnet are mounted upon the lower bar 57 of the frame. An oscillating iron armature 60 is mounted upon a pivot in ears of the upper bar 56 of the frame work. The upper bar 56 is insulated from the upright supports of the frame work, as indicated at 61, Fig. 10. There is a brass pin 62, Fig. 10, in one end of the armature 60 to prevent it making an iron to iron contact with the core 63 of the electromagnet, and a set screw 64 permits adjustment of the oscillations of the armature in the other direction. The wires 47 are attached to the windings of the electromagnets to open and close the switch between the brass pin 62 and the iron core 63 of the right hand electromagnet, and the horseshoe magnet 55 will retain the armature 60 in its open or closed position as it is left by the last action of the electromagnet. The operative circuit when the switch is closed is through wire 48 at the upper left hand corner of Fig. 10, the upper bar 56 of the frame, the armature 60, brass pin 62, core 63 of the right hand spool of the electromagnet, lower bar 57 of the frame and continuation of wire 48 at the right hand lower corner of Fig. 10.

It will be observed that each of the segments 19 with its wire 48 and portions of one of the switches AA, as already described, will form a partial circuit when its switch is closed, and that this partial circuit completes that part of the main circuit which is used in common by all the transmitting and receiving instruments. Which one or more of these partial circuits will thus complete the main circuit depends upon which of the switches AA are closed by the operation of the regulating impulse, and these partial circuits may therefore be designated as partial selective circuits. In order to have a complete circuit there must always be a unit of these partial selective circuits connected into the transmission circuit, but whether this unit shall consist of a single such partial selective circuit or of a larger number of them, is largely a matter of mechanical preference. As illustrated, at least two of the segments 19 and the other elements making up the partial selective circuits are used to receive and transmit the impulses.

The apparatus thus far described consists of an electrical circuit, or electrical circuits, for the transmission of intelligence composed of three portions. The first portion comprises a partial common circuit used in common by the transmitting and receiving instruments, and which in turn consists of two portions, one constant, and the other variable. The constant portion of this partial common circuit consists of what I have hereinbefore designated as the main service wire, (the ground will probably be used as a part of this circuit and I have intended to include the ground or some other return wherever I have used the word "wire" in the claims); and the variable portion of this partial common circuit consists of a unit of the partial selective circuits as hereinbefore described and which may be automatically selected and placed from time to time in electrical connection with the main service wire in such manner as to become an extension thereof to be used in common for the time being by the transmitting and receiving instruments. The second portion may be designated as the distributing mechanism, and comprises the parts of the apparatus used separately by each transmitting or receiving instrument, such as the instruments themselves, a number of partial circuits in which the transmitting instruments are inserted, a number of partial circuits in which the receiving instruments are inserted, and mechanisms by which each of the partial transmitting circuits and each of the partial receiving circuits is placed successively in electrical connection with the partial common circuit for a brief space of time, so that messages may be transmitted by means of short electrical impulses. The third portion may be designated as means or mechanism for selecting a unit of the selective partial circuits, which in the description hereinbefore given comprises the commutator segments 46 and the arms 44 and 53 with their brushes 45 and 54 together with the switches AA, and whose function is to include automatically and from time to time in the partial common transmitting circuit that unit of the selective partial circuits which will correct, offset and make immaterial a difference in speed of rotation of the devices at the different transmitting and receiving stations and so synchronize the apparatus as to cause the message of each transmitting instrument to be received by its corresponding receiving instrument and that instrument only. Even if the rotors at the two stations should rotate in exact unison or synchronism, it is still practically necessary that the impulses passing through each transmitting device shall be at once received by its proper receiving device, and this is accomplished in my invention by the first controlling impulse transmitted during the first rotation of the controller mechanism selecting the proper segment, or set of segments, of the commutator, that is, practically instantaneously.

It will be readily understood that it is immaterial whether the commutators 1, 18, 38, and 65, (see for latter Fig. 7), are stationary and the brushes 9, 25, 36, 45 and 54 revolve about them, or the brushes are stationary and the commutators rotate, and I have used the term rotary in the claims to include either arrangement as may be preferred in practice. It will also be understood that I do not limit myself to the number of brushes 9 and 25 illustrated in the drawings. Eight such brushes have been selected only as a convenient number for illustration and description.

It will be readily understood by electricians that the exact arrangement of transmitting and receiving instruments, commutators and revolving brushes shown in the drawings is not essential, but may be varied in numerous ways without departing from my invention. For example, in Fig. 1 the transmitting instruments are indicated at 15 each having its own stationary brush 10 and each connected electrically with its special revolving brush 9. But the commutator 1 might be made up of eight segments, and the eight instruments indicated at 15 might each be placed between the source of electrical energy or the ground and these segments. A single arm 8 with its brush 9, and a single stationary brush 10 with its ring commutator 6 would then replace the eight sets of these elements, and complete the electrical connection with the main wire 17. The receiving station might also be arranged in a similar manner. And other changes in the relative positions of the several mechanical elements might be made, as any skilled electrician will readily perceive.

Figure 13:
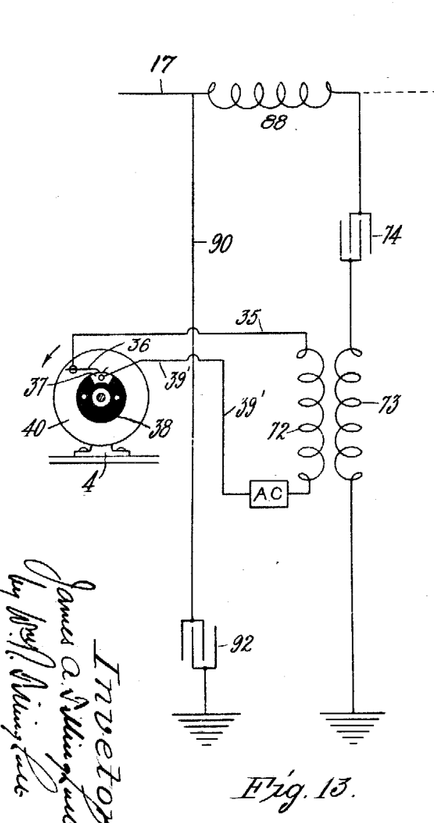
Figs. 13 and 14 are diagrammatical drawings indicating a method of regulating or synchronizing the entire device by using the same wire as that used for the transmission of intelligence.
Figure 14:
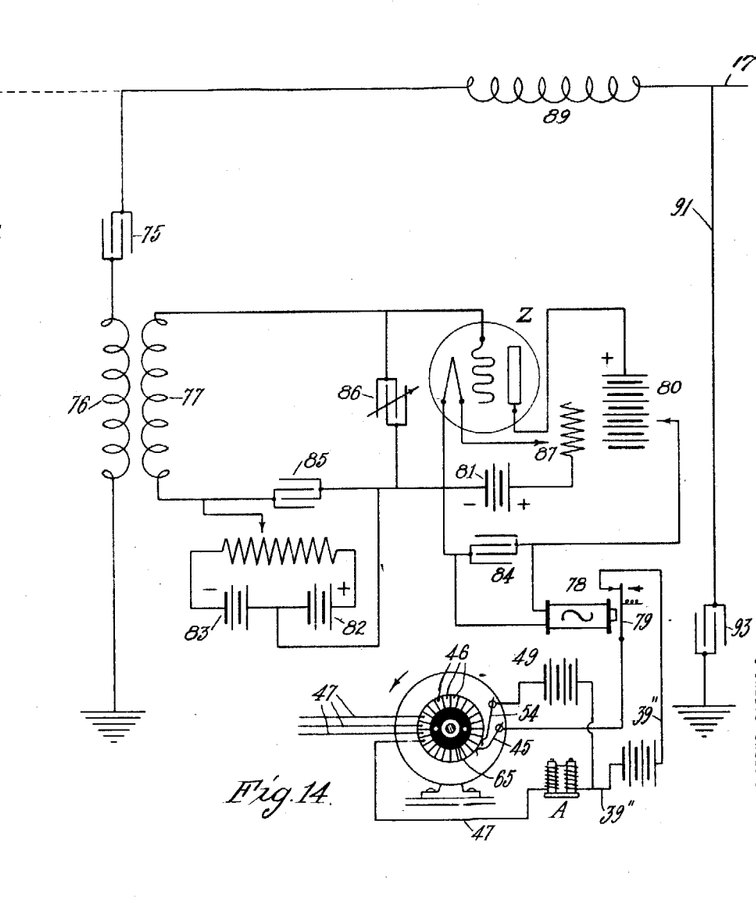

I have above described the controlling device as including a second wire between the regulating and regulated stations, but in Figs. 13 and 14, I have illustrated diagrammatically one method of effecting the control over the same wire as is used for the transmission of messages. Fig. 13 illustrates the arrangement of the necessary elements at the regulating station, and Fig. 14 the apparatus at the regulated station. Line 17 at the top of both figures is the main service wire already described, the broken line portion of it serving to indicate that it extends from one station to the other. In Fig. 13 I have repeated the disk 40 of Fig. 3 and sufficient of its coöperative devices to show their connection with this modified controlling apparatus, and in the same manner I have repeated in Fig. 14 disk 65 of Fig. 7 and enough of its coöperative devices for the same purpose, and the various parts have been given the same numbers as in the other drawings; but it must be understood that instead of the controller wire 39 shown in the other drawings and described as extending from one station to the other, there are in this modified arrangement two wires each constituting a part of a local circuit. I have, therefore, designated these wires as 39' and 39''. At the regulating station, Fig. 13, there is a source of alternating current, which I have designated as A. C., and when the circuit, (local in this modification), is closed by the brush 36 passing over the segment 37 to which wire 39' is attached, an alternating current is for an instant passed through the transformer winding 72 and a current is thereby induced in its corresponding transformer winding 73, which passes to wire 29 through the condenser 74 and from the wire 29 in Fig. 14, at a regulated station, through condenser 75 and the transformer winding 76 to ground. An instantaneous current is thereby induced in the corresponding transformer winding 77, and through the action of the audion represented by Z and the devices operating in conjunction with it, causes the relay or magnet 78 to close the switch 79. I have indicated the relay or magnet 78 as for an alternating current although the current may not always be a strictly alternating one or may even be at times a direct current. The various devices coöperating with the audion, as the batteries 80, 81, 82 and 83; the condensers 84 and 85; the adjustable condenser 86; and the resistance 87; and their action are too well known to require detailed description. The switch 79 serves to close the local circuit of which wire 39'' is a portion. In the main drawings, where the second controller wire was used, one battery at the regulating station was sufficient for the entire circuit, while in this modification there are necessarily two batteries, one for each of the local circuits of which wires 39' and 39" are portions. The same reference numerals designate the same parts of the controlling mechanism in Fig. 14 as in Figs. 7 and diagram Fig. 9, and the action of the devices will be readily understood without further description. This method of control permits the use of small alternating currents which will not interfere with the operation of the telegraph instruments by direct current as ordinarily employed. The inductive resistances 88 and 89 are designed to prevent the alternating control current from affecting the telegraph instruments at either end of the line, and the ground lines 90 and 91 with the condensers 92 and 93 are inserted as additional precautions for the same purpose.

I have already stated that the form of switch described above and which I have heretofore used may not be the best or most advantageous in all cases. A certain relation and adjustment between the speed of rotation of the mechanism at the transmitting and receiving stations; the number and inertia of the instruments employed for transmitting and more particularly for receiving the impulses; and the character of the switches used, is advantageous, if not required; and it may well happen that one character of switch will prove better with certain receiving instruments, and with certain speeds of rotation, and another form with other instruments and another speed of rotation. But it is impossible to anticipate and describe what will prove most advantageous in these respects in actual practice.

Figure 12:
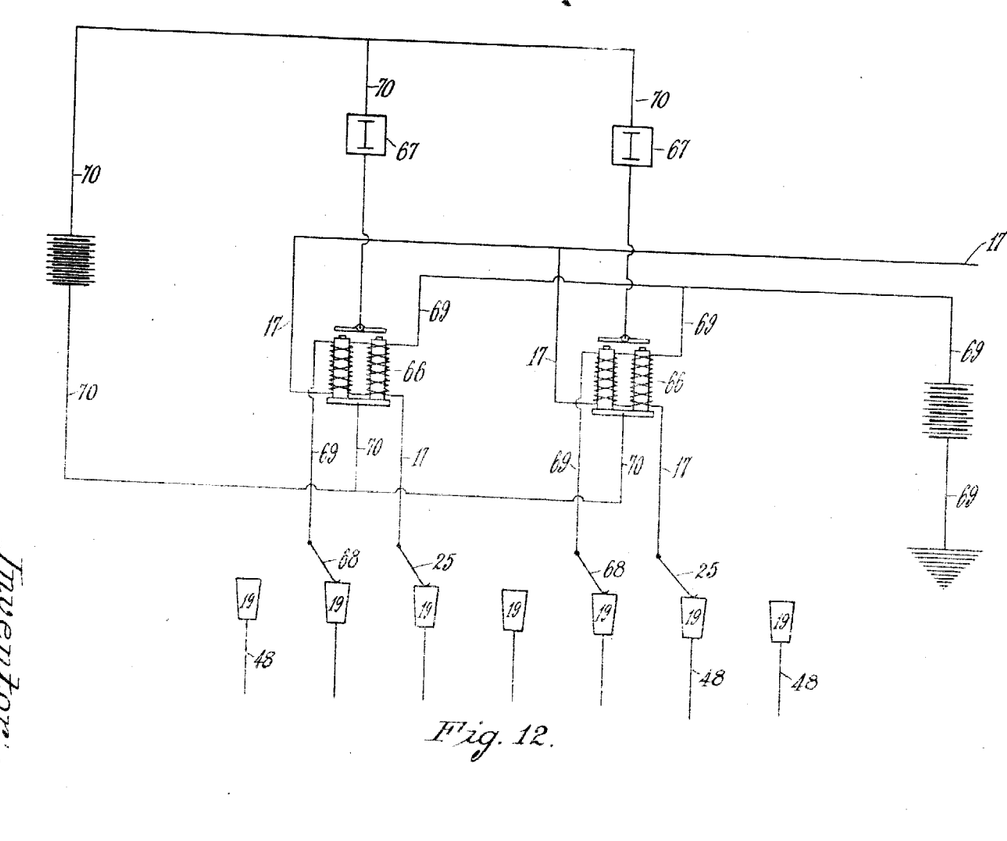
Fig. 12 is a diagrammatical drawing of a supplementary feature of my invention.

The electrical impulses are very short and it may well prove advantageous not to permit these impulses to directly affect the receiving instruments, but use them to influence local relay mechanisms which will permit longer impulses to directly affect those instruments. I have illustrated diagrammatically such an additional mechanism in Fig. 12,—where, however, for the sake of clearness, two only of the eight receiving instruments are indicated. In Fig. 9 the locations of the receiving instruments are indicated by the make and break contacts at 29. In the mechanism illustrated in Fig. 12 these receiving instruments are replaced by the switches 66, whose mechanical construction is the same in all respects as those already described, except that the spools of the electromagnets are wound with two wires, as indicated, but other forms of switches may prove to be advantageous in practice. The receiving instruments are located in relay circuits, as at 67. The main service wire 17 arriving from the other station at the right of Fig. 12 passes to the switches 66 and constitutes one of the windings of the electromagnet spools, after which it passes to the brushes 25, segments 19, and wires 48 as in the other drawings. The effect of the electrical impulses received over wire 17 is to close those of the switches 66 through which the impulse is permitted to pass by reason of its circuit being completed. There is a second brush 68 for each brush 25, so arranged that it will bear or brush upon that segment 19 just in advance of that upon which brush 25 bears. The arrangement is exactly the same as the two brushes 54 and 45 of Figs. 5 and 7, except that there are assumed to be eight sets of two brushes each instead of one set. The action of the circuits in which the brushes 68 are placed is also the same as that of the circuit in which brush 54 is placed, namely, to open in turn any switches which happen to be closed. The latter circuits as illustrated in Fig. 12 may be traced by the wire 69 starting at the ground indicated at the right of the drawing, with its battery as indicated, thence passing through the second of the two windings upon the spools of the electromagnets, and to the brushes 68, segments 19, and wires 48 to ground. The relay circuits containing the receiving instruments 67 consists of its battery at the left of the drawing and wires 70, it being understood that these circuits are connected to the switches 66 in exactly the same manner as wires 48 are connected to the switches AA, (Fig. 9), as hereinbefore described; so that when any one of the switches 66 is closed the circuit through that switch to its corresponding receiving instrument 67 is completed.

The effect of this additional feature of my invention is to prolong the electrical impulse affecting the receiving instrument, since instead of each of these instruments receiving an impulse only during the time brush 25 is passing over those segments 19 which are placed in the electrical circuit by the closing of switches AA, which in the apparatus illustrated can never exceed one-eighth of the time of rotation of shaft 20, that switch 66 which is closed by that impulse will remain closed until its brush 68 completes a circuit to open it. Thus the interval of time during which switch 66 is closed and thereby permits the receiving instrument to be directly acted upon electrically, is nearly a complete revolution of shaft 20, and thereby lessens the time during which the action of the device is dependent upon the inertia of the receiving instruments.

The electrical impulses are each for a fraction of one rotation of the rotor, and the time of a complete rotation of the rotor is less than the dot of the telegraph code. Consequently, when my invention is used for telegraphic purposes, the inertia of the receiving instruments, (or the additional relay), permits the impulses sent through each transmitting instrument to be regrouped into the dots and dashes of that code and thereby reconstruct the message.

The regulating station shown in the first four figures of the drawings has been described and illustrated in its simplest form; but it may well be that in practice it will prove advantageous to have it more nearly a duplication of the mechanism of the regulated station.

Although my apparatus has been described with simple telegraph circuits, it is possible that the diplex, duplex, quadruplex or other systems of telegraphy may be used to advantage in combination with it.

The words "intelligence" and "message," as used in the claims, are intended to include all forms of transmissions over a wire, such as for example phototelegraphy, as well as telegraphic messages; and in like manner the expressions "transmitting instruments" and "receiving instruments," as used in the claims, are not intended to be limited to ordinary telegraphic instruments, but to include any electrical device to control, or to be controlled by, the electrical impulses of the transmission circuit.

I claim as my invention:

1. Electrical apparatus for transmitting intelligence, comprising a wire, distributing mechanism including a number of sets of instruments, each set including a transmitting instrument and a receiving instrument, a plurality of selective partial circuits, and mechanism for selecting from time to time and including in the transmitting circuit so as to be used by all the instruments in common that unit of the selective partial circuits which will enable the transmitting and receiving instruments of each set to operate unaffected by the operation of those of any other set.

2. Electrical apparatus for transmitting intelligence, comprising a wire, distributing mechanism, a portion of which is rotary, including a number of sets of instruments, each set including a transmitting instrument and a receiving instrument, a plurality of selective partial circuits, and mechanism for selecting from time to time and including in the transmitting circuit so as to be used by all the instruments in common that unit of the selective partial circuits which will enable the transmitting and receiving instruments of each set to operate unaffected by the operation of those of any other set.

3. A number of partial electrical circuits each containing a transmitting instrument, a number of partial electrical circuits each containing a receiving instrument, a partial electrical circuit common to all the instruments, mechanism making electrical connections between the partial common circuit and the partial circuits containing the transmitting instruments to permit the passing of electrical impulses from such instruments successively, mechanism for making electrical connections between the partial common circuit and the partial circuits containing the receiving instruments successively, and means for changing a part of the partial common circuit so as to cause the impulses through each transmitting instrument to be received by its own receiving instrument.

4. An electrical circuit, including a common partial circuit, a distributing mechanism including a number of transmitting instruments with a device for making electrical connections between the common partial circuit and the transmitting instruments to permit the passing of electrical impulses through such instruments successively and including a number of receiving instruments also with a device for making electrical connections between the common partial circuit and the receiving instruments to permit the passage of the impulses through such instruments successively, a commutator composed of several segments, and means for selecting from time to time and connecting as part of the common partial circuit that unit of the segments which will cause the electrical impulses through each transmitting instrument to be received by the predetermined corresponding receiving instrument.

5. An apparatus for transmitting at the same time several messages over an electrical circuit, comprising a partial circuit used in common by all the messages, composed in part of a wire and in part of a unit of selective partial circuits, a distributing mechanism including several sets of transmitting and receiving instruments, mechanism, a portion of which is rotary, to include the transmitting instruments successively in the transmitting circuit, and mechanism, a portion of which is rotary, to include the receiving instruments successively in the transmitting circuit, a number of selective partial circuits, and mechanism for selecting and connecting as part of the partial circuit used in common by all the messages such unit of the selective partial circuits as will offset or compensate any difference in the speed of the rotary portions of the distributing mechanism and thereby cause each set of transmitting and receiving instruments to transmit and receive its own message.

6. Mechanism for transmitting intelligence over a wire, comprising in addition to the wire and several transmitting and several receiving instruments a rotary device for making electrical connections between the wire and the transmitting instruments successively to permit the passing of short electrical impulses, a rotary device for also making electrical connections between the wire and the receiving instruments successively, a commutator composed of several segments, and mechanism consisting of a rotary device and automatic switches for selecting from time to time some one or more of the segments of the commutator and establishing the electrical circuits through it or them for periods of time in such manner that the receiving instruments will be synchronized with the transmitting instruments and the impulses sent through each transmitting instrument will be received by its corresponding receiving instrument.

7. An apparatus for transmitting intelligence by intermittent electrical impulses consisting of a partial circuit used in common by all the electrical transmitting impulses, composed in part of a wire and in part of a unit of selective partial circuits, a number of transmitting instruments and a number of receiving instruments, and timing mechanisms, a portion of each of which is rotary, to connect into the transmitting circuit intermittently the transmitting instruments successively and the receiving instruments successively, a commutator of several segments and means for compensating time variations in the connections made by the timing mechanisms by selecting and including in the common partial circuit such an unit of the segments of the commutator as to permit each intermittent electrical impulse to be received by the predetermined receiving instrument.

8. A device for transmitting intelligence over a wire by intermittent electrical impulses, comprising in addition to the wire, several sets of transmitting and receiving instruments, mechanisms for making electrical connections between the wire and the transmitting instruments successively and between the wire and the receiving instruments successively to permit the passing of electrical impulses, and a timing device consisting of two moving portions, one operating at the regulating station and the other at the regulated station, and means for compensating differences in the relative speeds of the two portions by automatically changing a part of the circuit.

9. Apparatus for sending multiple messages comprising a partial circuit used in common by all the messages, composed in part of a wire and in part of a unit of selective partial circuits, distributing mechanism including transmitting mechanism which in turn includes a number of transmitting instruments and receiving mechanism which in turn includes a number of receiving instruments; a number of selective partial circuits, and mechanism for selecting and including as part of the partial circuit that unit of the selective partial circuits which will synchronize transmitting and receiving mechanism that the message of each transmitting instrument will be received by its corresponding receiving instrument.

10. Apparatus for transmitting intelligence over a wire, comprising in addition to the wire, a number of transmitting devices through which electrical impulses pass to the wire successively, and a number of receiving devices, combined with a commutator composed of several segments and controlling mechanism which will periodically complete the electrical circuits through some one or more of the segments of the commutator and thereby so synchronize the transmitting and receiving devices that the impulses through each transmitting device will be received by its corresponding receiving device.

11. Electrical apparatus for transmitting intelligence, comprising a wire, distributing mechanism including a number of sets of instruments, each set including a transmitting instrument and a receiving instrument, in a relay circuit, a plurality of selective partial circuits, and mechanism for selecting from time to time and including in the transmitting circuit so as to be used by all the instruments in common that unit of the selective partial circuits which will enable the transmitting and receiving instruments of each set to operate unaffected by the operation of those of any other set.

12. Apparatus for sending multiple messages comprising a partial circuit used in common by all the messages, composed in part of a wire and in part of a unit of selective partial circuits, distributing mechanism including transmitting mechanism which in turn includes a number of transmitting instruments and receiving mechanism which in turn includes a number of receiving instruments; in relay circuits a number of selective partial circuits, and mechanism for selecting and including as part of the partial circuit that unit of the selective partial circuits which will synchronize the transmitting and receiving mechanisms so that the message of each transmitting instrument will be received by its corresponding receiving instrument.

13. A number of partial electrical circuits each containing a transmitting instrument, a number of partial electrical circuits each operating a relay device in a circuit containing a receiving instrument, a partial electrical circuit common to all the other partial electrical circuits, mechanism making electrical connections between the partial common circuit and partial circuits containing the transmitting instruments to permit the passing of electrical impulses from such instruments successively, mechanism for making electrical connections successively between the partial common circuit and the partial circuits operating the relay devices.

and means for changing a part of the partial common circuit so as to cause the impulses through each transmitting instrument to be received by its own relay device.

14. Electrical apparatus for transmitting intelligence, comprising a wire, distributing mechanism, a portion of which is rotary, including a number of sets of instruments, each set including a transmitting instrument and a receiving instrument, in a relay circuit, a plurality of selective partial circuits, and mechanism for selecting from time to time and including in the transmitting circuit so as to be used by all the instruments in common that unit of the selective partial circuits which will enable the transmitting and receiving instruments of each set to operate unaffected by the operation of those of any other set.

15. An apparatus for transmitting intelligence by intermittent electrical impulses consisting of a partial circuit used in common by all the electrical transmitting impulses, composed in part of a wire and in part of a unit of selective partial circuits, a number of transmitting instruments and a number of receiving instruments in relay circuits, and a device for making electrical connections between the common partial circuit and the transmitting instruments to permit the passing of electrical impulses controlled by such instruments successively and a device for making electrical connections between the common partial circuit and the receiving instruments to permit the control of such instruments by the successive impulses, a commutator composed of several segments, and means for selecting from time to time and connecting as part of the common partial circuit that unit of the segments which will cause the electrical impulses controlled by each transmitting instrument to control the predetermined corresponding receiving instrument.

16. Apparatus for the electrical transmission of intelligence, comprising a partial circuit used in common by the transmitting electricity; distributing mechanism with other partial circuits not used in common by the transmitting electricity; a plurality of selective partial circuits; and mechanism for selecting from time to time and connecting into the partial circuit used in common by the transmitting electricity as part thereof, that unit of the selective partial circuits which will enable the transmitting electricity, to convey the intelligence.

17. Apparatus for the electrical transmission of intelligence, comprising a partial circuit used in common by the transmitting electricity; distributing mechanism, a portion of which is rotary, with other partial circuits not used in common by the transmitting electricity; a plurality of selective partial circuits; and mechanism for selecting from time to time and connecting into the partial circuit used in common by the transmitting electricity as part thereof, that unit of the selective partial circuits which will enable the transmitting electricity to convey the intelligence.

JAMES A. TILLINGHAST.